United States Patent
Li et al.

(10) Patent No.: US 9,102,247 B2
(45) Date of Patent: Aug. 11, 2015

(54) EASY OPERATIONAL SEAT WITH DUAL DIRECTION TORSION BAR

(71) Applicant: Ford Global Technologies, LLC, Dearborn, MI (US)

(72) Inventors: Richard Li, Novi, MI (US); Paul Gerard Ferraiuolo, Allen Park, MI (US); Roy Chapman, Canton, MI (US); Ammeswara Rao Sajja, Canton, MI (US); Glenn Scott, Dexter, MI (US); Brandon Nichols, Hillsdale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 13/839,077

(22) Filed: Mar. 15, 2013

(65) Prior Publication Data

US 2014/0265505 A1   Sep. 18, 2014

(51) Int. Cl.
*B60N 2/22* (2006.01)
*B60N 2/20* (2006.01)

(52) U.S. Cl.
CPC ............. *B60N 2/20* (2013.01); *Y10T 29/49826* (2015.01)

(58) Field of Classification Search
USPC .................................. 297/301.3, 302.3, 303.3
See application file for complete search history.

(56) References Cited

U.S. PATENT DOCUMENTS

| | | | |
|---|---|---|---|
| 5,755,493 A | 5/1998 | Kodaverdian | |
| 5,806,931 A * | 9/1998 | Kogai | 297/301.3 |
| 5,839,782 A * | 11/1998 | Kashiwamura et al. | 297/337 |
| 5,938,286 A | 8/1999 | Jones et al. | |
| 5,979,980 A * | 11/1999 | Amorin et al. | 297/218.4 |
| 6,513,875 B1 | 2/2003 | Gray et al. | |
| 7,722,120 B2 * | 5/2010 | Toyooka et al. | 297/354.12 |
| 2001/0052722 A1 * | 12/2001 | Amorin et al. | 297/378.1 |
| 2002/0158496 A1 * | 10/2002 | Chu et al. | 297/301.3 |

FOREIGN PATENT DOCUMENTS

KR   20020034742 A   5/2002

OTHER PUBLICATIONS

Your VW Features, web page http://www.vw.com/en/tools/owners/routan/2011/guides.suffix.html/ovmy=routan~2F2011/tcont=guides.html#/tab=undefined|grid=ba9e88d90276df2bbb93ebc99c3c294d, Date Unknown, 2 pages.

* cited by examiner

*Primary Examiner* — Kristina Junge
(74) *Attorney, Agent, or Firm* — Vichit Chea; Price Heneveld LLP (57) ABSTRACT

A vehicle seat bar assembly having a seat with first and second engagement members. A rear seat bracket extends between the first and second engagement members of a seat. A torsion bar extends between the first and second engagement members and is operably engaged therewith. The torsion bar includes an intermediate bracket engagement portion and a first and second linear portion that extends between the first engagement member and the intermediate bracket engagement portion and the second engagement member and the intermediate bracket engagement portion. The torsion bar also includes a first and second distal end configured to engage the first and second engagement members, respectively, which induces a torsional resistance in the torsion bar when the seatback is at a fully reclined position and when the seatback is at a fully folded position.

19 Claims, 7 Drawing Sheets

FIG. 7 ered as limiting, unless the claims expressly state otherwise.
EASY OPERATIONAL SEAT WITH DUAL DIRECTION TORSION BAR

FIELD OF THE INVENTION

The present invention generally relates to a vehicle seat bar assembly, and more particularly to an easy operational seat with a dual direction torsion bar for a vehicle seat bar assembly.

BACKGROUND OF THE INVENTION

Spring assemblies are generally utilized in vehicles to assist in movement of seatbacks from reclining to folding flat or facilitating the seatback returning to its original position.

SUMMARY OF THE INVENTION

One aspect of the present invention includes a vehicle seat bar assembly having a seat having first and second engagement members. A rear seat bracket extends between the first and second engagement members. A torsion bar extends between the first and second engagement members and is operably engaged therewith. The torsion bar includes an intermediate bracket engagement portion and first and second linear portions extending between the first engagement member and the intermediate bracket engagement portion and the second side member and the intermediate bracket engagement portion. The torsion bar also includes first and second distal ends configured to engage the first and second side members, respectively, which induces a torsional resistance in the torsion bar when the seatback is at a fully reclined position and when the seatback is at a fully folded position.

Another aspect of the present invention includes a vehicle seat bar assembly having a seatback with a rear seat bracket extending between first and second engagement members of a seat. A torsion bar extends between and is engaged with the first and second engagement members such that a torsional resistance is induced when the seatback is in one of a first predetermined position and a second predetermined position relative to the seat.

Another aspect of the present invention includes a vehicle seat bar assembly having a seat with first and second engagement members. A rear seat bracket extends between the first and second side members and a torsion bar extends between the first and second engagement members and is operably engaged therewith. The torsion bar includes an intermediate bracket engagement portion and first and second distal ends configured to engage the first and second engagement members, respectively.

Yet another aspect of the present invention includes a method of making a seat bar assembly, that includes fixedly coupling a first and second distal end of a torsion bar to a first and second engagement member of a seat, respectively, and pivotally coupling an intermediate bracket engagement portion of the torsion bar to a rear seat bracket of a seatback to induce a torsional resistance in the torsion bar when the seatback is in one of a first predetermined position and a second predetermined position relative to the seat.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
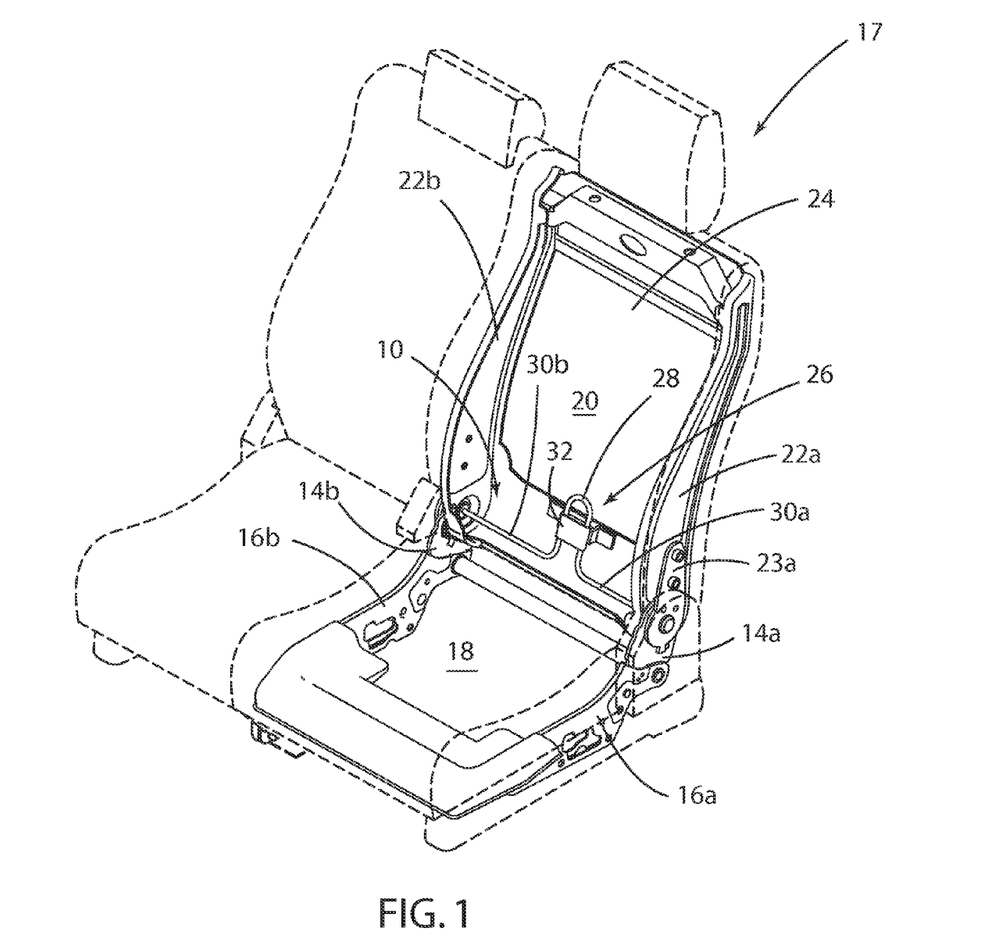
FIG. 1 is front perspective view of one embodiment of a vehicle seat assembly having a vehicle seat bar assembly operably coupled thereto.
Figure 2:
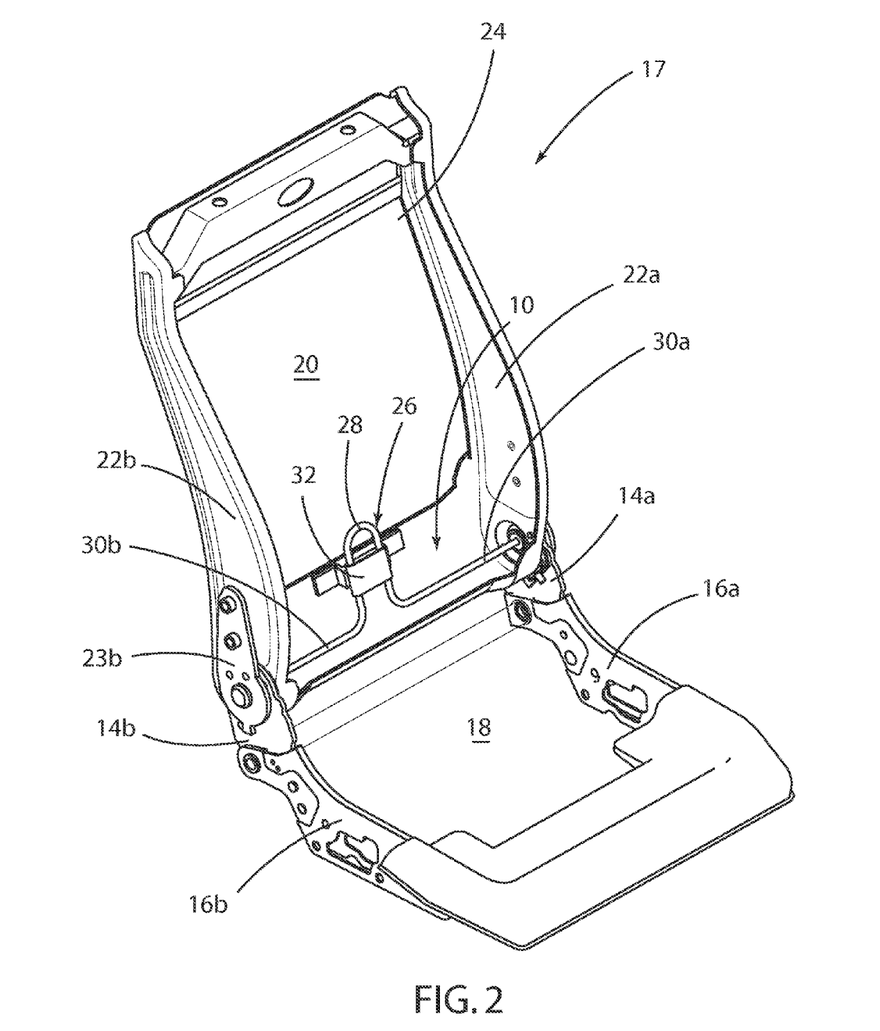
FIG. 2 is a top perspective view of the seat assembly of FIG. 1.
Figures 3A, 3B:
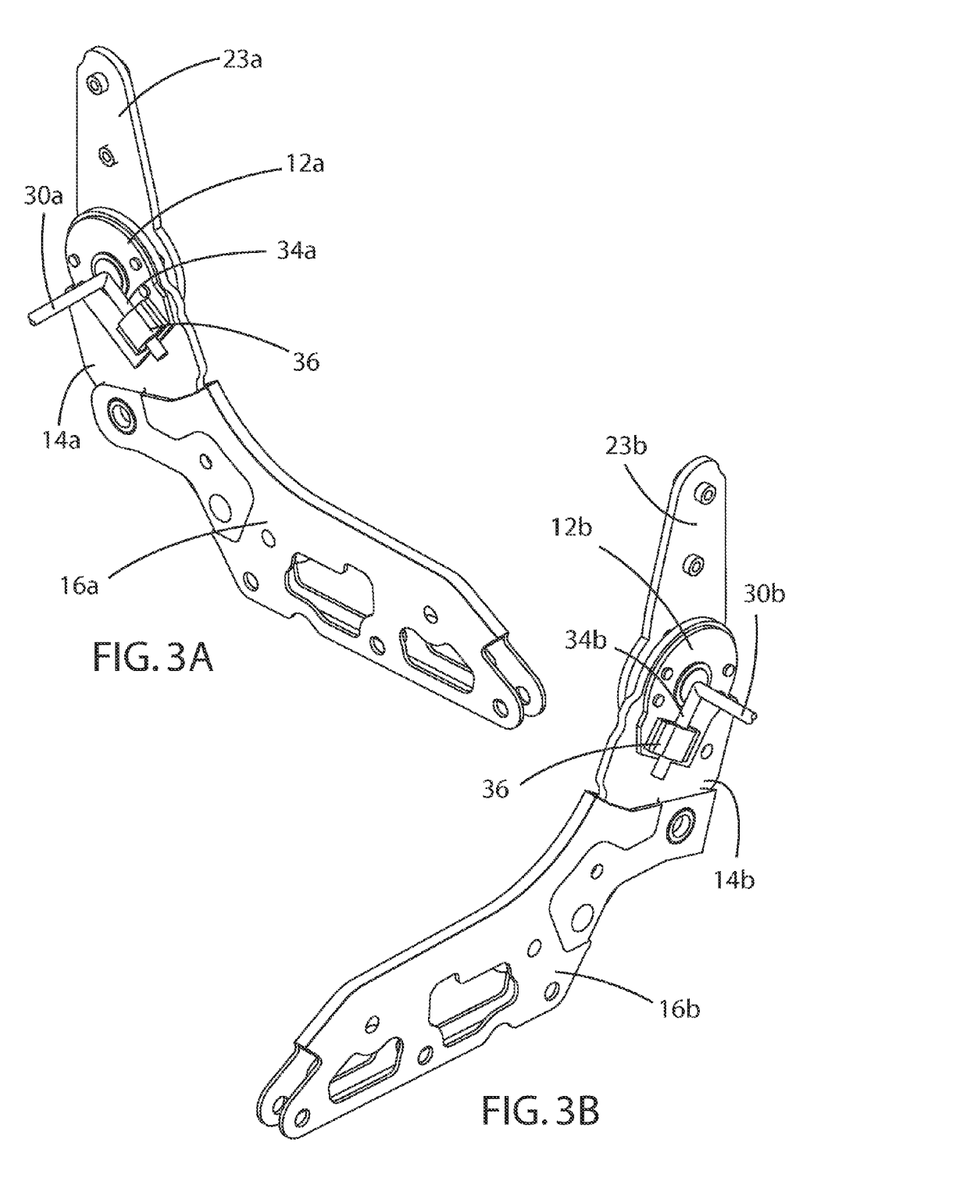
FIG. 3A is a top perspective view of the vehicle seat bar assembly of FIG. 1 taken from one side of the vehicle seat assembly.
FIG. 3B is a top perspective view of the vehicle seat bar assembly of FIG. 1 taken from the other side of the vehicle seat assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring now to FIGS. 1-2, and 3A-3B, the reference numeral 10 generally designates a vehicle seat bar assembly including a first engagement member 12a and a second engagement member 12b. Engagement member 12a is coupled to a first lower arm engagement 14a and engagement member 12b is coupled to a second lower arm engagement

14b. Lower arm engagement 14a is part of a first lower arm 16a and lower arm engagement 14b is part of a second lower arm 16b and lower arms 16a and 16b are typically disposed within a seat 18 of a vehicle seat assembly 17 that also includes a seatback 20. The lower portion of seatback 20 is placed proximal to the seat 18 and includes a first side member 22a coupled to lower arm engagement 14a via a first upper arm 23a and a second side member 22b coupled to lower arm engagement 14b via a second upper arm 23b, and a rear seat bracket 24 that extends between side members 22a and 22b and is typically molded to the same.

Vehicle seat bar assembly 10 also includes a torsion bar 26 that extends between engagement members 12a and 12b and is operably engaged therewith. The torsion bar 26 includes an intermediate bracket engagement portion 28 that is elongate having a substantially U-shaped end and extending upwardly between a first and second linear portion 30a, 30b that extend horizontally with respect to the seat 18. Intermediate bracket engagement portion 28 is pivotally coupled to the rear seat bracket 24 via a sleeve 32 mounted to the rear seat bracket 24 such that at least a portion of intermediate bracket engagement portion 28 engages the sleeve 30 when seatback 20 is folded or reclined. Linear portions 30a and 30b each include a distal end 34a, 34b, respectively. Distal ends 34a and 34b are disposed to extend orthogonally outward with respect to linear portions 30a and 30b and point in different directions with respect to one another. In addition, distal ends 34a and 34b are each coupled to a fastener 36, which in turn couples distal ends 34a and 34b to engagement members 12a and 12b, respectively. In this manner, distal ends 34a and 34b are configured to engage engagement members 12a and 12b, respectively, such that a torsional resistance is induced in torsion bar 26 when the seatback 20 is at a fully reclined position and when the seatback 20 is at a fully folded position.

Figure 4:
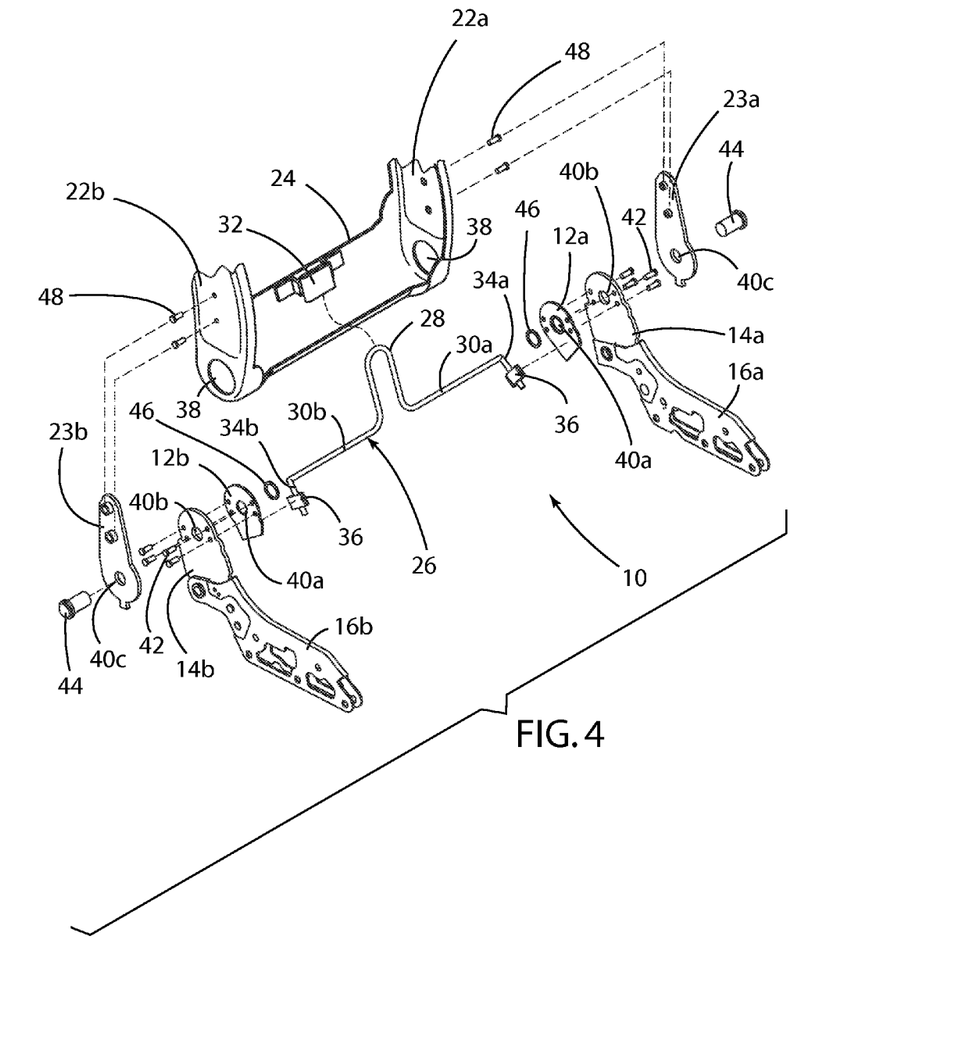
FIG. 4 is an exploded top perspective view of the vehicle seat bar assembly of FIG. 2.

Referring now to FIG. 4, the vehicle seat bar assembly 10 is generally designed to be positioned between the seat 18 and the seatback 20. Intermediate bracket engagement portion 28 is engaged to sleeve 32 and distal ends 34a and 34b are each inserted through an opening 38 formed in each side member 22a, 22b. Distal ends 34a and 34b are each fixedly engaged to their respective fasteners 36, which in turn are fixedly engaged to engagement members 12a and 12b. Opening 40a is formed in each engagement member 12a, 12b and engagement members 12a and 12b are positioned adjacent to and between corresponding lower arm engagements 14a and 14b such that the opening 40a of each engagement member 12a, 12b is aligned with a complimentary opening 40b formed on each lower arm engagement 14a, 14b. Engagement members 12a and 12b are fixedly engaged to lower arm engagements 14a and 14b by screws 42. Upper arms 23a and 23b are positioned adjacent to the outside of corresponding lower arm engagements 14a and 14b and an opening 40c that complements openings 40a and 40b is formed in each upper arm 23a, 23b. Opening 40c of each upper arm 23a, 23b is aligned with opening 40a and 40b of each corresponding lower arm engagement 14a, 14b and upper arms 23a and 23b are each pivotally coupled to corresponding lower arm engagements 14a and 14b via a pivoting post 44 that extends through openings 40a, 40b, and 40c and is engaged to a washer 46 that prevents pivoting post 44 from slipping out of the openings 40a, 40b, 40c. Additionally, upper arms 23a and 24b are fixedly engaged to corresponding side members 22a and 22b via screws 48.

Thus, in the embodiment of FIG. 4, distal ends 34a and 34b are stationary during all stages of directional movement of the seatback 20 while the intermediate bracket engagement portion 28 pivots in conjunction with the seatback 20 due to being pivotally coupled to the rear seat bracket 24 via sleeve 32. As a result, this causes linear portions 30a and 30b to twist in the direction of motion, thereby inducing some torsional resistance in the torsion bar 26 that biases the torsion bar 26 to a neutral position 50, as shown in FIGS. 5 and 5A.

Figures 5, 5A:
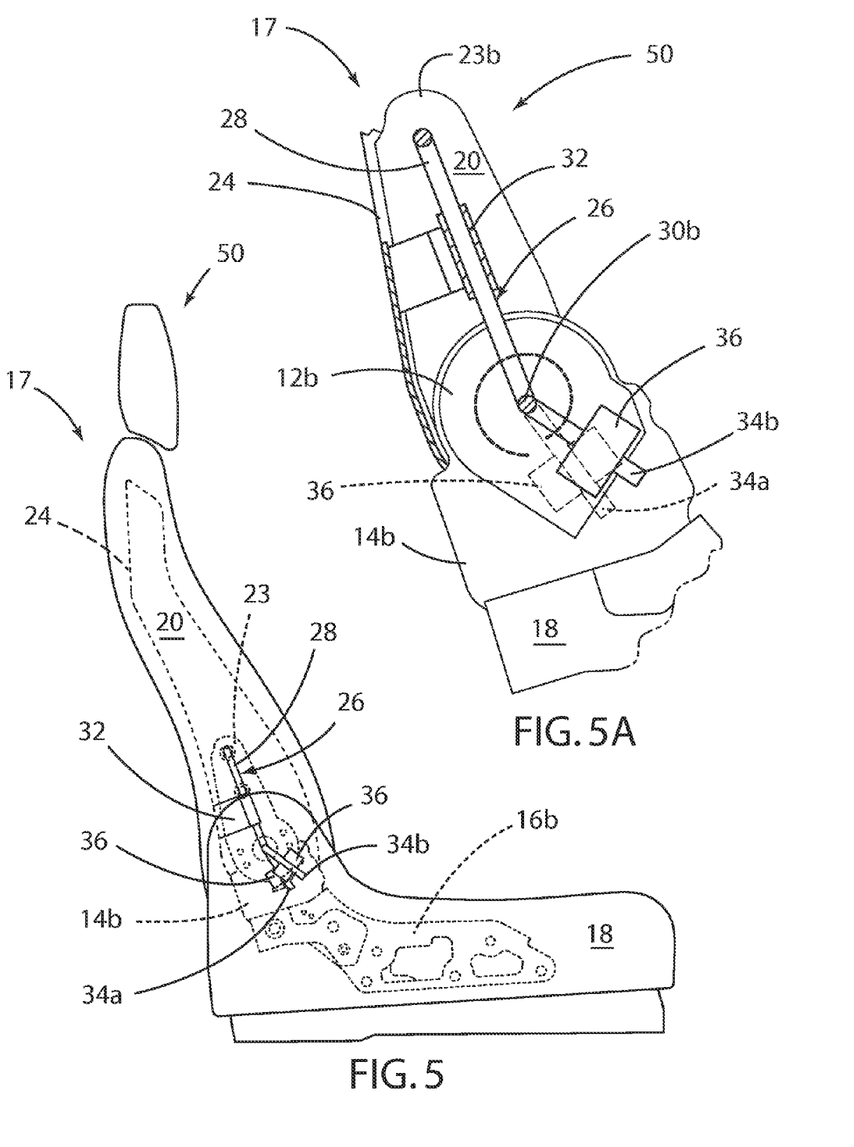
FIG. 5 is a side elevational view of the vehicle seat assembly with seatback in a neutral position.
FIG. 5A is a side elevational view of the vehicle seat bar assembly in the neutral position.

In FIGS. 5 and 5A, the torsion bar 26 is not typically experiencing torsional resistance and does not act on the seatback 20. When the seatback 20 is placed in motion, however, the weight of the seatback 20 is sufficient to overcome the torsional resistance of the torsion bar 26 and drives the seatback 20 to one of a first and second predetermined position 52, 54, which correspond to a fully folded and fully reclined position, respectively.

Figure 6:
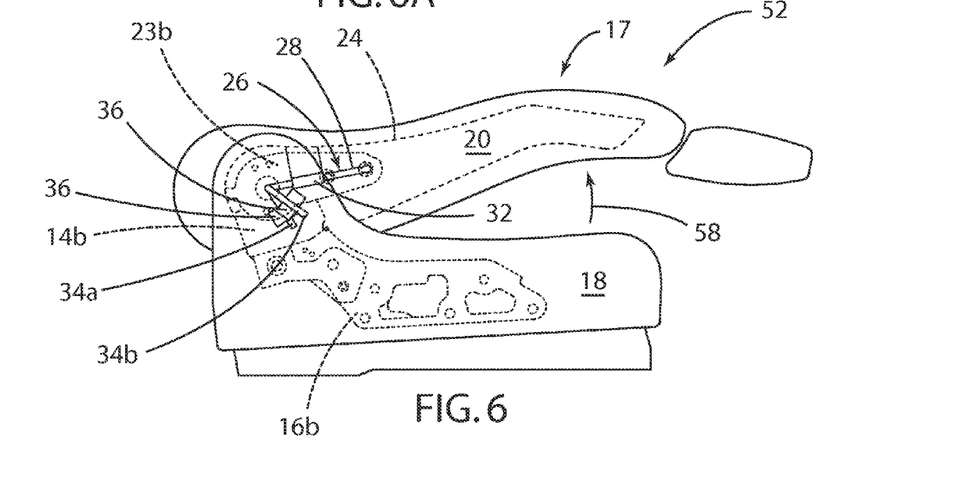
FIG. 6 is a side elevational view of the vehicle seat assembly with seatback in a folded position.
Figure 6A:
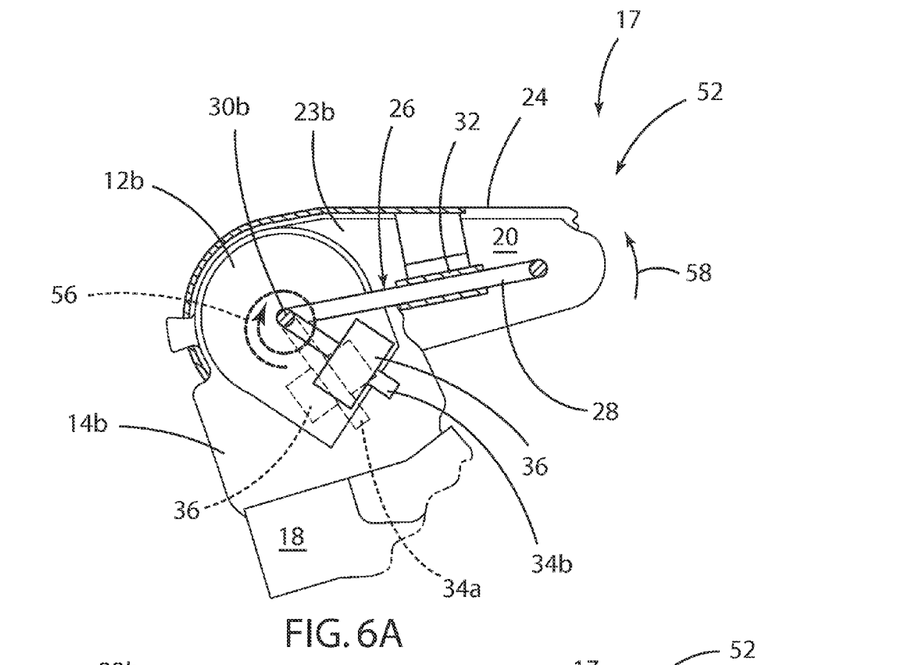
FIG. 6A is a side elevational view of the vehicle seat bar assembly in the folded position.

When the seatback 20 is moved to the first predetermined position 52, as shown in FIGS. 6 and 6A, linear portions 30a and 30b of torsion bar 26 are twisted in a forward direction as shown by arrow 56. As a result, torsional resistance is induced in the torsion bar 26. Specifically, intermediate bracket engagement portion 28 is acting on the sleeve 32 in the direction of arrow 58 to, at least partially, balance the weight of the seatback 20. In this manner, with the help of the torsional resistance of the torsion bar 26, a user can more easily pivot the seatback 20 to a different position such as the neutral position 50 or the second predetermined position 54.

Figures 7, 7A:
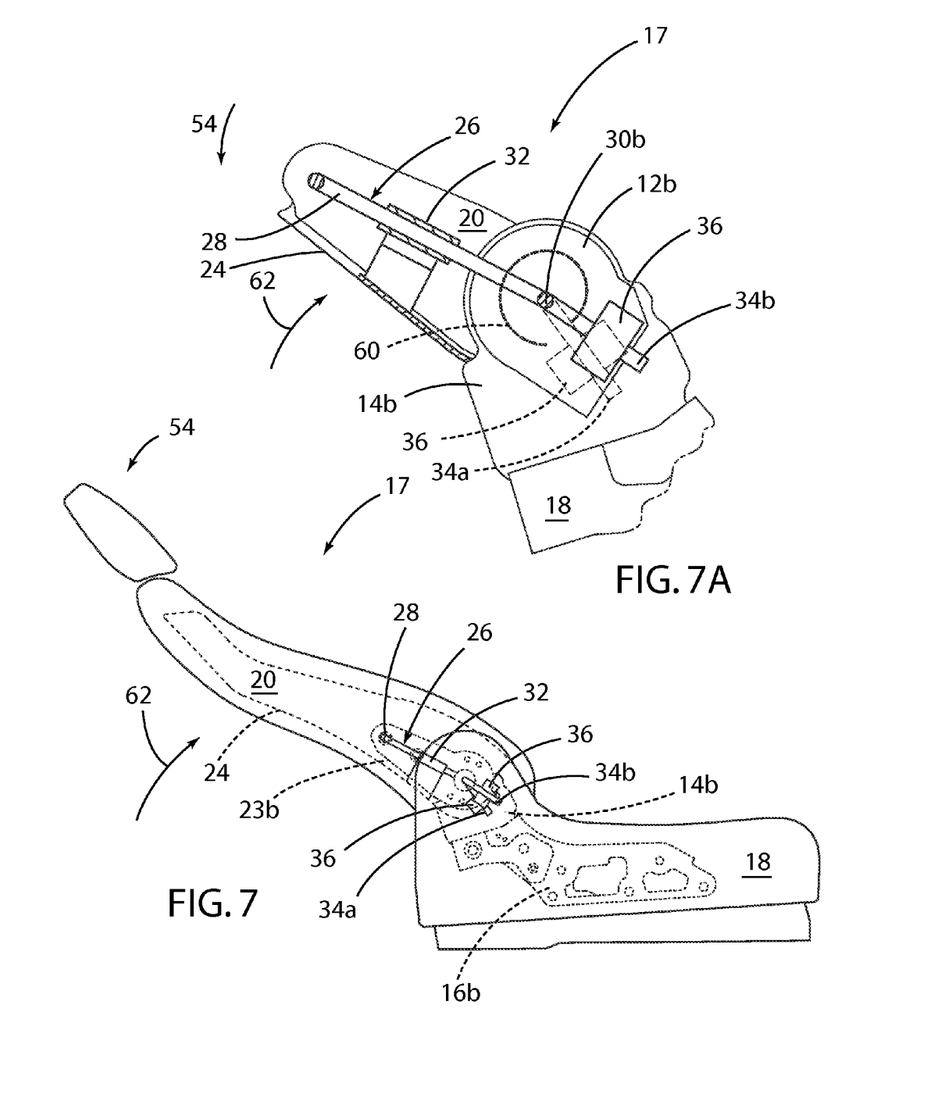
FIG. 7 is a side elevational view of the vehicle seat assembly with seatback in a reclined position.
FIG. 7A is a side elevational view of the vehicle seat bar assembly in the reclined position.

With particular reference to FIGS. 7 and 7A, the seatback 20 is shown fully reclined in the second predetermined position 54. In predetermined position 54, linear portions 30a and 30b of torsion bar 26 are twisted in a rearward direction as shown by arrow 60, thereby inducing torsional resistance in the torsion bar 26. Specifically, torsion bar 26 is acting on the sleeve 32 in the direction of arrow 62 to, at least partially, balance the weight of the seatback 20. In this manner, with the help of the torsion resistance of the torsion bar 26, a user can more easily pivot the seatback 20 to a different position such as the neutral position 50.

Accordingly, a vehicle bar assembly 10 has been advantageously shown and described herein. The vehicle bar assembly 10 includes a torsion bar and the torsional resistance properties associated with the torsion bar may be utilized when pivoting a seatback relative to a seat. It is to be understood that the torsion bar may take on various characteristics. The characteristics of the torsion bar will dictate the shear and/or torsional resistance properties of the torsion bar and are determined by a variety of factors such as length, shape, and/or material, and should be considered alongside the properties of the vehicle seat assembly, for which the vehicle bar assembly is adapted to be used.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seat bar assembly comprising:
   a seat having first and second engagement members;
   a seatback having a rear seat bracket extending between the first and second engagement members;
   a sleeve mounted to the rear seat bracket and parallel to a top edge of the rear seat bracket; and
   a single torsion bar extending between the first and second engagement members and operably engaged therewith, the torsion bar including:
   an intermediate portion having first and second engagement portions, wherein both said first and second engagement portions are insertably engaged with the sleeve;
   first and second linear portions that extend between the first engagement member and the intermediate bracket engagement portion and the second engagement member and the intermediate bracket engagement portion; and
   first and second distal ends configured to engage the first and second engagement members, respectively, which induces a torsion resistance in the torsion bar when the seatback is at a fully reclined position and when the seatback is at a fully folded position.

2. The vehicle seat bar assembly of claim 1, wherein the first and second distal ends are parallel with respect to each other and extend in different directions.

3. The vehicle seat bar assembly of claim 1, wherein the intermediate portion is substantially U-shaped and is pivotally coupled to the rear seat bracket.

4. The vehicle seat bar assembly of claim 3, wherein pivotal movement of the intermediate bracket engagement portion causes the first and second linear portions to twist in the direction in which the intermediate portion is pivoting.

5. The vehicle seat bar assembly of claim 1, wherein the torsion bar is horizontally disposed.

6. A vehicle seat bar assembly comprising:
   a seatback having a rear seat bracket extending between a first and second engagement member of a seat; and
   a sleeve mounted to the rear seat bracket and parallel to a top edge of the rear seat bracket;
   a single torsion bar including a first and a second engagement portion, the first and second engagement portions insertably engaged with the sleeve, the torsion bar extending between and engaged with the first and second engagement members, such that a torsional resistance is induced in the torsion bar when the seatback is in one of a first predetermined position and a second predetermined position relative to the seat.

7. The vehicle seat bar assembly of claim 6, wherein the first and second engagement portions at least partially define an intermediate portion of the torsion bar and wherein the torsion bar further comprises an intermediate portion disposed between a first and second linear portion, wherein the first and second linear portions are disposed between a first and second distal end, the first and second distal ends fixedly engaged to the first and second engagement members, respectively.

8. The vehicle seat bar assembly of claim 7, wherein the first and second distal ends are parallel with respect to each other and extend in different directions.

9. The vehicle seat bar assembly of claim 7, wherein the intermediate portion is substantially U-shaped and is pivotally coupled to the rear seat bracket.

10. The vehicle seat bar assembly of claim 9, wherein pivotal movement of the engagement portion causes the first and second linear portions to twist in the direction in which the intermediate portion is pivoting.

11. The vehicle seat bar assembly of claim 6, wherein the torsion bar is horizontally disposed.

12. A vehicle seat bar assembly comprising:
    a seat having first and second engagement members;
    a seatback having a rear seat bracket extending between the first and second engagement members;
    a sleeve mounted to the rear seat bracket and parallel to a top edge of the rear seat bracket; and
    a single torsion bar horizontally disposed and extending between the first and second engagement members and operably engaged therewith, the torsion bar including:
    an intermediate portion having first and second engagement portions, wherein both said first and second engagement portions are insertably engaged with the sleeve; and
    first and second distal ends configured to engage the first and second engagement members, respectively.

13. The vehicle seat bar assembly of claim 12, wherein the first and second distal ends extend in different directions.

14. The vehicle seat bar assembly of claim 12, wherein the intermediate portion is substantially U-shaped and is pivotally coupled to the rear seat bracket.

15. The vehicle seat bar assembly of claim 14, wherein pivotal movement of the intermediate portion causes the first and second linear portions to twist in the direction in which the intermediate portion is pivoting.

16. The vehicle seat bar assembly of claim 14, further comprising a first and second linear portion that extends between the first distal end and the intermediate portion and the second distal end and the intermediate portion, respectively.

17. The vehicle seat bar assembly of claim 16, wherein pivotal movement of the intermediate portion causes the first and second linear portions to twist in the direction in which the intermediate portion is pivoting.

18. A method of making a seat bar assembly, comprising:
    fixedly coupling a first and second distal end of a torsion bar to a first and second engagement member of a seat, respectively; and
    mounting a sleeve to a rear seat bracket of a seatback and parallel to a top edge of the rear seat bracket; and
    insertably engaging both a first and a second engagement portion of a single torsion bar to the sleeve such that an intermediate portion of the torsion bar is pivotally coupled to the rear seat bracket of the seatback to induce a torsional resistance in the torsion bar when the seatback is in one of a first predetermined position and a second predetermined position relative to the seat.

19. The method of claim 18, further comprising the step of providing a neutral position, wherein torsional resistance is not induced in the torsion bar.

* * * * *